Figure 1:
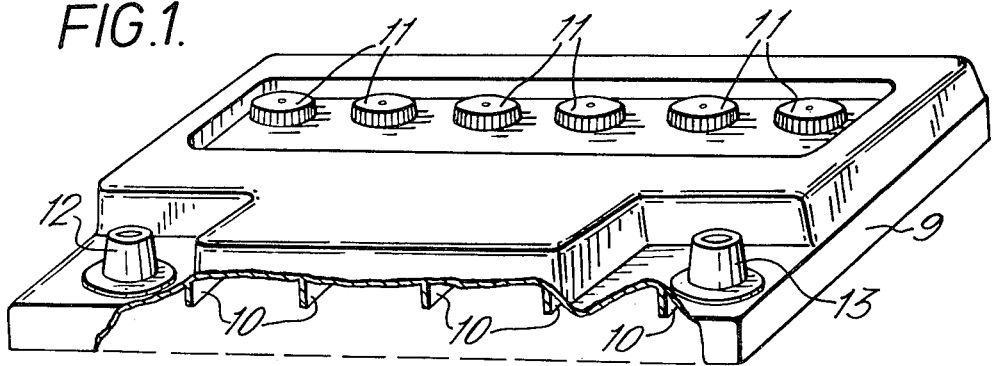
Figure 1:
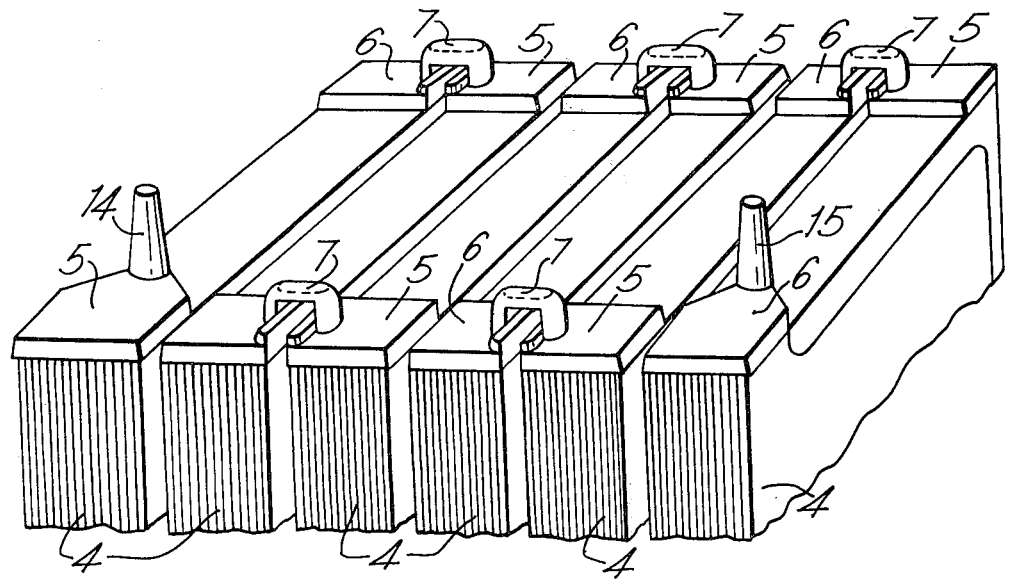
Figure 1:
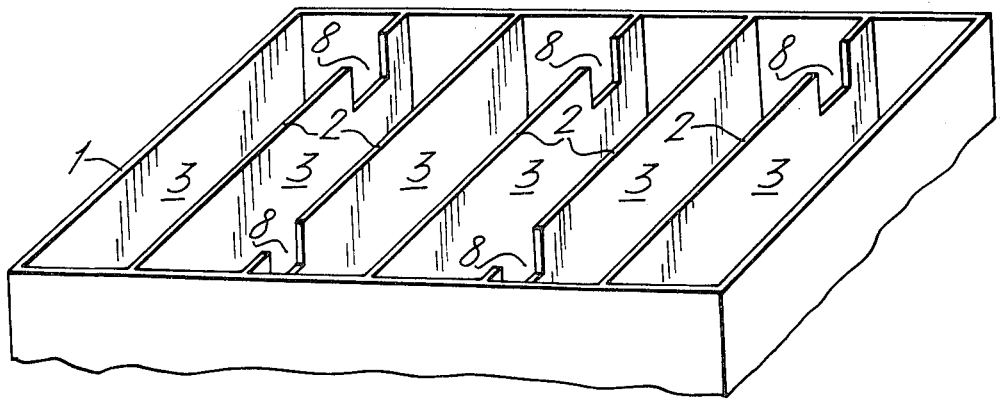

United States Patent [19]

Bergh et al.

[11] 3,900,343

[45] Aug. 19, 1975

[54] METHOD OF ASSEMBLING STORAGE BATTERIES AND INJECTION MOULD FOR CARRYING OUT THE METHOD

[75] Inventors: Gunnar Bergh; Kjell Brass; Jorgen Hessner, all of Oslo; Thomas Varberg, Hosle, all of Norway

[73] Assignee: Sonnak Batterier A/S, Oslo, Norway

[22] Filed: Dec. 10, 1973

[21] Appl. No.: 423,403

[30] Foreign Application Priority Data
Dec. 12, 1972 Norway.............................. 4572/72

[52] U.S. Cl............................................. 136/134 R
[51] Int. Cl..................... H01m 13/10; H01m 35/32
[58] Field of Search................................ 136/134 R

[56] References Cited
UNITED STATES PATENTS

| 1,721,293 | 7/1929 | Callender........................ 136/134 R |
| 3,468,720 | 9/1969 | Jensen............................. 136/134 R |
| 3,692,587 | 9/1972 | Vetor et al...................... 136/134 R |

*Primary Examiner*—John H. Mack
*Assistant Examiner*—H. A. Feeley

[57] ABSTRACT

An intercell connection for storage batteries having one bridge for each cell and a connecting member between the bridges, each bridge being provided with a rib which is adapted to form part of the bottom of a tool for closing a recess in a partition wall.

8 Claims, 7 Drawing Figures

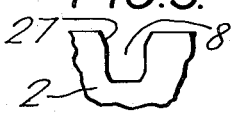
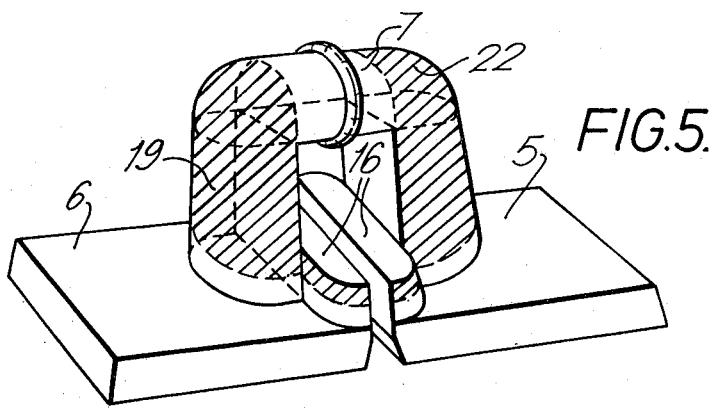
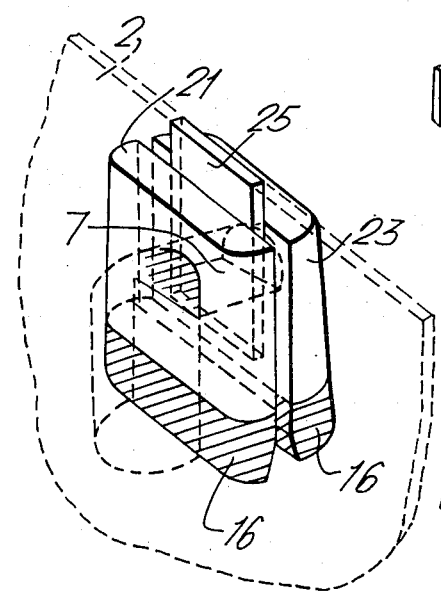
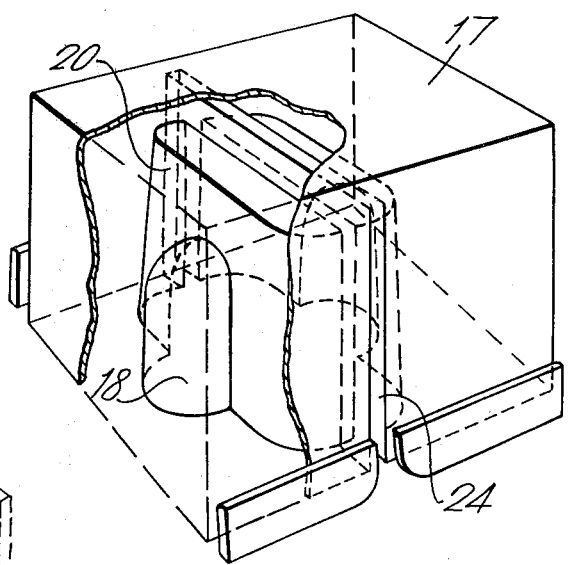

METHOD OF ASSEMBLING STORAGE BATTERIES AND INJECTION MOULD FOR CARRYING OUT THE METHOD

The present invention relates to a method of assembling storage batteries of the type comprising battery cases of thermoplastic material having a cavity divided into cells by means of partition walls and with inserts of an electric element in each cell, connected to elements in adjacent cells by connectors through the partition walls. The case is closed with a cover by means of mirror welding or adhesion, is sealed at the poles and is then ready for filling of electrolyte.

The constantly increasing demands to greatest possible battery effect within more or less standardized exterior dimensions has led to the construction of more and more compact storage batteries. Previously, the connectors between the cells were positioned on the exterior of the battery, and present day demands have led to the connectors being disposed within the battery case to extend through the partition walls between the cells.

Publications are previously known which describe various solutions for passing connectors through the partition walls and, as example, reference is made to Norwegian Pat. applications Nos. 4122/69, 1125/72 and 329/72.

In the known methods of establishing connections through the partition walls, the connectors are made for example, by one-spot welding of the elements through an opening in the partition wall subsequent to disposal of the elements in each cell, or by a two-point welding of the elements, subsequent to their disposal, over a connection which in one or other manner, is cast in the partition wall, or by positioning all elements simultaneously after these have been interconnected in one manner or an other by connectors which pass through respective partition walls in an upwardly open recess therein.

The requirements in all of these methods are that the battery is sealed around the connection, and that the partition wall is restored so that no creepage currents occur, and that the restoration is to be such that the mirror welding or adhesion between case and cover also contributes to a creepage-current resistant partition between the cells.

Problems arise in all these methods including complex case constructions of expensive design, designs having low productivity, designs which cause deformed cases, complex solutions of case which create difficulties in assembling the battery and have low productivity and great amount of wastage or entail a large number of complaints, and utilization of production equipment which is extremely expensive and complex, with expensive loss of work time.

The object of the present invention is to simplify substantially the conditions relating to the assembly of batteries disposed in a case with cover of thermoplastic material, and particularly in regard to the small battery factory which has a small production series and modest investment per battery type.

In accordance with the invention, this is achieved by a combination of known and novel features where all elements and connectors are produced as a finished element-unit prior to disposal in the battery case, and where the partition walls in the battery case are provided with open recesses allowing space for the connectors when the element-unit is disposed in position in the case.

The invention is characterized in that the partition walls of the case are provided with recesses allowing space for the connectors when the element-unit is disposed in the case, and in that all elements and connectors of each battery are moulded integrally in one operation to a finished unit prior to disposal in the battery case, that the connector between two elements is disposed directly onto two adjacent bridges each connecting the plates of the same polarity in one element, and that an injection moulding tool constructed as a simple pipe tool, together with the connector and partition wall, forms an adequately sealed injection mould which, during injection moulding with liquid thermoplastic material injected at correctly determined pressure during the injection cycle, can be held together by the modest resistance provided by the base support of the case through two relatively weak adjacent elements of the connection, and through a weak, supported case wall with recess, and in that, by the said injection moulding, a creep-current resistant restoration of the partition wall is achieved with sealing around the connector, and that the edge of the partition wall is thereby suitable for mirror welding or adhesion between cover and case.

A further development of this invention is characterized in that recesses and connectors are relatively dimensioned such that the edges of the recesses form a guide for the connector on disposal of the element-unit in the case, whereby the unit obtains an approximately correct position in the battery case within limits determined by the working area of the injection moulding tool, the lowering of the tool over a connector and corresponding recess effecting the final position of the connector in the recess and thereby of the element-unit with respect to the case immediately prior to injection moulding.

In accordance with the invention, the recesses can be formed with at least one oblique edge for guiding the element-unit and the oblique edge can be uniformly inclined from the bottom to the opening or be inclined only at the outer (or upper) portions thereof, and, at the inner portions of the edges of the recesses, inclinations which are opposed to the outer portions, may be provided.

The invention further relates to an injection moulding tool for carrying out the method, and is characterized by being a single cavity tool, which restores one partition wall while simultaneously sealing the corresponding connection, or as a multi-cavity tool which restores a plurality of partition walls and simultaneously seals the corresponding connections.

The invention is further explained in the following with reference to the drawing where:

FIG. 1 illustrates the components of a storage battery of the type comprised by the invention, FIGS. 2, 3 and 4 illustrates various designs of recesses in the partition walls of the battery case, FIG. 5 illustrates, in enlarged dimension, a connection between two elements of adjacent cells, FIG. 6 illustrates a tool for restoration of the partition wall at a recess where a connector is located, and FIG. 7 illustrates a restored partition wall.

On FIG. 1, the components of the storage battery are illustrated in separated state for the sake of clarity, and the battery consists of a case 1 having partition walls 2 so that cells 3 are provided for elements 4 which are to be disposed in the cells. The elements 4 are constructed of positive and negative plates, plates of one polarity being interconnected at the top at one corner of each element by means of bridges, as indicated at 5, the plates of opposite polarity being interconnected at the top of the other corner by means of corresponding bridges 6, and the bridges 5 and 6 are interconnected by means of a connection 7 such that the cells are coupled in series, and the lead battery illustrated, which has six cells, yields 12 volts.

The element-unit 4, 5, 6, 7 is disposed in the case 1 in one operation and, in the partition walls 2, recesses 8 are provided which allow space for the connectors 7. After restoration of the partition walls 2 in the recesses 8 and sealing around the connectors 7, the case 1 is closed with a cover 9, which is previously moulded and which, on the underside thereof, has low partition wall members 10 which fit the partition walls 2 of the case and are connected to these by mirror welding or adhesion. The cover is provided, in known manner, with filling openings for electrolyte, and these are closed by plugs 11. Further, the cover has poles 12, 13 which, when the cover is placed in position, are connected to pole pieces 14, 15 on the outer bridges 5, 6 of the element-units.

What particularly characterizes the present invention is that the connector 7 are disposed on top of two adjacent bridges 5, 6. This is clearly illustrated on FIG. 5 and, by this disposal, the bridges 5 and 6 and connector 7 are in a position with respect to each recess 8 such that the surfaces of the rib portion or sealing strip 16 on the bridges 5, 6 can form the bottom of a injection moulding tool and are sufficiently supported by the relatively weak underlying elements to allow them to withstand the pressure from the injection moulding. Rib portion 16 is a length greater than the width of the slot in the partition wall and is adapted such that when element unit 4, 5, 6, 7 is disposed in case 1, rib portion 16 forms around the bottom of the slot in the partition wall and serves together with the partition wall to form the bottom of the injection mould when the partition wall is sealed around the connection.

An expedient injection moulding tool is illustrated on FIG. 6 and it is effected as a single piece 17 with casting cavity for the thermoplastic material. The casting cavity can be formed by the aid of a simple milling tool, and it is provided with a portion 18, which fits tightly around the hatched portion 19 of the connector 7, and a portion 20 where the injection moulding takes place. The shape of the portion 20 is such that the injected material forms a cake 21 on one side of a partition wall 2 as illustrated on FIG. 7. As illustrated in broken lines on FIG. 6, the other side of the injection moulding tool is effected symmetrically such that it fits tightly around the hatched portion 22 of the connector 7 and leaves a cake-like plastic portion 23 on the other side of the partition wall 2, as illustrated on FIG. 7. The tool 17 has a slot 24 which fits tightly over the partition wall 2 and is closed at the top such that, in the injection moulding tool between the walls therein and the recess 8, a casting cavity is also created together with the remaining casting cavity, the upper portion of the recesses 8 being filled with plastic material 25, as illustrated on FIG. 7, whereby the partition wall 2 is restored up to its upper edge for sealing to the downwardly directed partition wall portion 10 on the underside of the cover 9, as illustrated on FIG. 1. At the same time, the thickened sealing of plastic material 21, 23 forms, on both sides of the partition wall 2, a creep current-resistant sealing around the connector 7. The cake-like plastic portions 21, 23 continue up from the portions 16 on the bridges 5 and 6 (FIG. 5) and the same bridge parts 16 are illustrated hatched on FIG. 7. As previously stated by the symmetrical disposition of the bridges 5 and 6, with respect to the recesses, the injection casting pressure from the injection of the thermoplastic material in the tool 17 is uniformly distributed over the underlying, relatively weak portions of the element, due to said symmetry, and with this uniform distribution, these portions are capable of withstanding and absorbing the injection moulding pressure necessary, without further measures being taken. This simplifies the production to a substantial degree and the tool is simple to produce and can also be effected as a multi-cavity tool whereby it is possible to restore some or all of the partition walls in a battery case in one operation with consequent further reduction of production costs.

It is correct, that the elements, when disposed in the case, are in a centralized position such that the tool 17 on FIG. 6 can be lowered over the connectors 7 without further adjustment of the position of the elements in the case. Such a preliminary centering can be effected by forming the recesses 8 in the partition walls 2 with oblique edges. Three examples of this are shown on FIGS. 2, 3 and 4, where the recess on FIG. 2 has edges 26 inclining outwardly from the bottom of the recess toward the opening. When a connector 7 is inaccurately placed in the recess 8, the inclined edges will guide the connector and thereby the element to a centralized position in the cell in the battery case. The same effect is achieved when only the outer portion 27 of the recess 8, as illustrated on FIG. 3, is oblique, however, the embodiment example on FIG. 4 has the same outer inclination 27 and also an inner inclination 28 which includes in opposed direction to the outer inclination. This last embodiment has the advantage of allowing good space for injection of plastic material on both sides of the connector 7, viewed along the partition wall 2.

The connectors 7 and the injection moulding tool 17 are adapted such that the final centering of the elements in the battery case takes place when the tool with a guided rectilinear motion is lowered over the connectors and guides these out of even minor inaccuracies of position before the partition wall 2 is restored by injection of plastic material into the recesses in the partition walls.

The examples illustrated serve merely to illustrate the invention and form no restriction of the scope afforded by this patent, other embodiment examples which are within the scope of the invention being readily envisaged.

Having described our invention, we claim:

1. A process for assembling a multicell storage battery comprising a thermoplastic container having at least one internal partition for dividing the container into a plurality of compartments, said partition having an opening in its upper portion comprising the steps of forming a one-piece unit comprising positive and negative plates, at least one bridge for retaining edge of said positive and negative plates respectively and at least one connector joining bridges of opposite polarity between said compartments, inserting said one-piece unit into said container such that said connector is within the opening in said partition, placing the open side of a one-piece mould over said connector and a portion of said partition immediately surrounding said opening in such a manner as to establish a tight seal between said open side, the lower portion of said connector and said partition portion thereby forming the bottom of an injection mould from the lower portion of said connector and said partition portion, injecting a thermoplastic material into said mould thereby forming a creep current-resistant seal around said connector and restoring said partition, removing said one-piece mould, positioning a cover of said container and securing said cover to said container.

2. A process according to claim 1 further including centering said one-piece unit while said one-piece unit is being inserted into said container.

3. A process according to claim 1 wherein the placing of the one-piece mould over said connector causes a final adjustment of said connector in said opening.

4. An up-end-over connector for a multicell storage battery having a thermoplastic container and at least one internal partition for dividing the container in its upper portion said connector comprising a central portion smaller than said opening serving to connect two legs each of which extend downwardly away from each end of said central portion and connect with bridge means, each leg having rib means fixed to a lower portion of said leg, said rib means extending beyond the sides of said leg a distance sufficient to allow said rib means to cover a bottom portion of said opening when said connector is in place in said opening.

5. A connector according to claim 4 wherein said opening is formed with at least one oblique edge.

6. A connector according to claim 4 wherein at least one of the side edges of the opening is uniformly inclined along its length.

7. A connector according to claim 4 wherein the upper portion of at least one of the edges of said opening is inclined.

8. A connector according to claim 4 wherein the bottom portion of at least one of the edges of the opening is inclined in an opposite direction to the inclination of the upper portions of at least one of said edges.

* * * * *